Oct. 15, 1968  P. F. DE VALLIERE  3,405,565

AUTOMATIC RELEASE DEVICES, MORE PARTICULARLY FOR MACHINE TOOLS

Filed Feb. 13, 1967

United States Patent Office 3,405,565
Patented Oct. 15, 1968

3,405,565
AUTOMATIC RELEASE DEVICES, MORE PARTICULARLY FOR MACHINE TOOLS
Pierre François de Valliere, 14 Ave. de Bretteville, Neuilly-sur-Seine, France
Filed Feb. 13, 1967, Ser. No. 615,601
Claims priority, application France, Feb. 17, 1966, 50,002; Jan. 6, 1967, 90,143
12 Claims. (Cl. 74—405)

ABSTRACT OF THE DISCLOSURE

An automatic release device for two drivingly coupled members mounted on displaceable supports, in which an adjustable magnetic coupling is formed between the supports to hold the members in driving relation with a predetermined force.

---

In machine tools such as lathes, for example, it is usual to incorporate a safety device for disengaging the mechanical feed on the machine if a resistance greater than a predetermined value is exerted through the kinematic transmission chain.

A release system of this kind usually includes a train of gears mounted on a rocker member capable of being placed into engagement with adjacent drive and output pinions and equipped with means which allow the reactions developed by the meshing pinions to disengage the pinions and move them away, in opposition to the action of these means, should said reactions exceed a predetermined limit.

It is the principal object of the present invention to provide simple, inexpensive and effective means of this kind.

It is another object of the invention to permit adjusting the action of these means in order to enable the release threshold of the device to be varied.

It is yet another object of the invention to cause the auxiliary rocker member pinions to continue to be driven even in the released position.

The present invention accordingly relates to a release device, notably for machine tools, which comprises a train of gears mounted on a rocker unit, this rocker unit being provided with a pole face adapted to cooperate magnetically with a second pole face of opposite polarity rigidly united with the body of the device. Preferably, the air gap between the two pole faces is adjustable in accordance with different forms of embodiment.

The invention likewise relates to a release device of the kind referred to, in which the rocker unit pinion cooperating with the drive pinion of the device is cut with the same module as said drive pinion, and in which the rocker unit pinion cooperating with the output pinion is cut with the same module as said output pinion, the latter mentioned module being less than that of the first mentioned two pinions. This difference in module enables the two pinions of larger module to be kept in mesh when, following release, the two pinions of smaller module are disengaged from each other.

In accordance with the invention, all the necessary pole faces are contained in a sealed case equipped with a pushrod passing through a leaktight sleeve and adapted to cooperate with an arm rigid with the rocker unit, said case being fixed in quickly detachably fashion on a wall of the casing enclosing the mechanism incorporating the rocker unit and being positioned externally to said wall.

The operator of a machine devised in this way can thus be provided with a set of different case-units of the same kind, each bearing an indication of the attraction force it is capable of sustaining, these case-units being mutually interchangeable in the quick-release securing means referred to above.

The quick-release securing means may include a threaded end-piece of the bottom of the case, and this end-piece has the pushrod extending through it slideably and leaktightly and is screwed and secured into a tapped hole in the casing of the release mechanism.

In addition, the rocker unit can be made to cooperate with a complementary adjusting element comprising a torsion bar of adjustable tension cooperating in turn with, a block formed with a tooth engaging into a notch in the rocker unit head, the arrangement being so devised that the action of the torsion bar partly opposes that of the magnetic device.

In such an arrangement, the magnetic device engenders a constant force from which is subtracted the adjustable force developed by the torsion bar, the resultant being therefore an adjustable force for maintaining the rocker unit pinions in mesh with the input and output pinions, and this adjustable force has opposed to it the radial gear-tooth reaction, which becomes predominant in the event of overloading torques and causes release to take place.

The description which follows with reference to the accompanying non-limitative exemplary drawings will give a clear understanding of how the invention can be carried into practice.

In the drawings:
FIGURE 1 illustrates a release device having a rocker unit equipped with magnetic release means according to the invention, showing cutaway portions to disclose said means and the eccentric pin permitting adjustment thereof;

Figure 1:
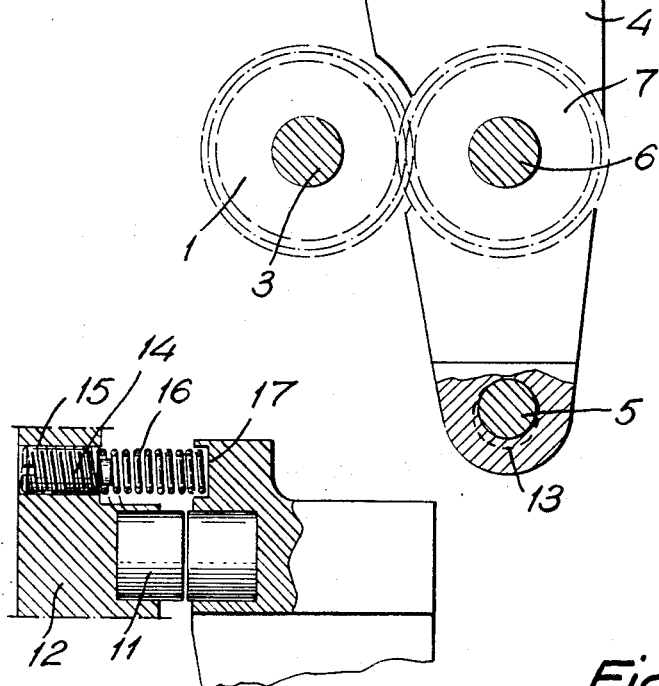
Figure 5:
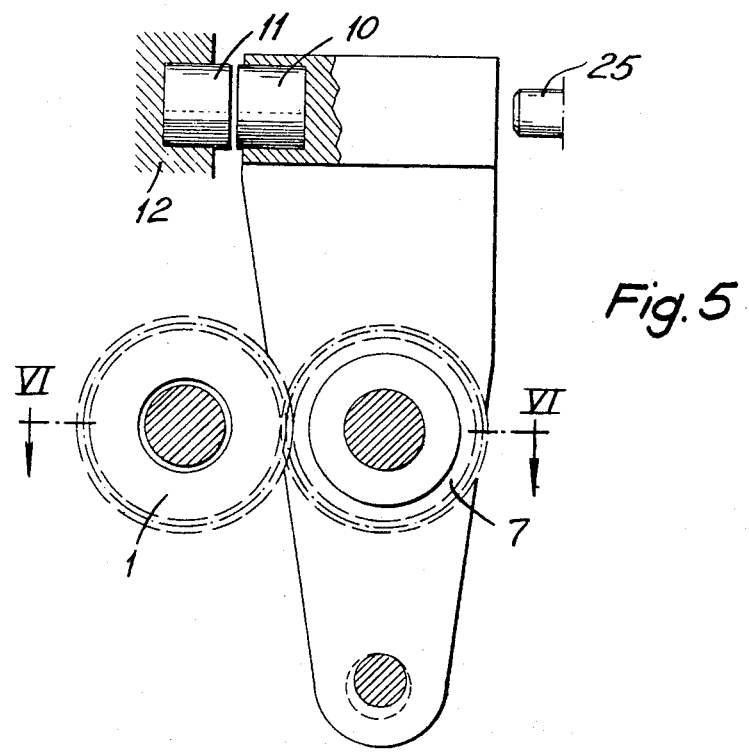
FIGURE 5 is an illustration corresponding to FIGURE 1 of a recoil limiting stop.
Figure 6:
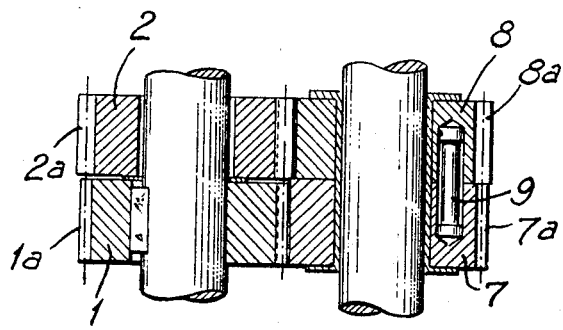
FIGURE 6 is a section through the line VI—VI of FIGURE 5.

As FIGURES 1, 5 and 6 clearly show, the rocker unit type release device enables drive to be transmitted from an input pinion 2 to an output pinion 1 which is keyed to a shaft 3 on which pinion 2 is loosely mounted. The frame of a rocker unit 4 pivotally connected to a pin 5 receives, facing said two pinions, a pin 6 having mounted thereon, with an interposed gland, a pair of pinions 7 and 8 which are designed to mesh respectively with pinions 1 and 2 and which are made angularly rigid with each other by means of cotters 9 fitted into facing blind holes formed in the sides of the pinions.

At the top of the rocker unit frame is a pole face 10 accommodated in the frame and projecting therefrom on the side adjacent pinions 1 and 2. Facing it is a further pole face 11 of opposite polarity projecting from the surface of the casing 12 of the device.

In one form of embodiment of the adjustment means of the air gap between pole faces 10 and 11, shown in FIGURES 1 and 5, the frame of rocker unit 4 is formed with eccentric bearings 13 adjustable in relation to pin 5.

Figure 2:
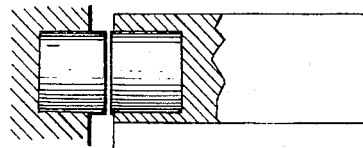
FIGURE 2 is a corresponding fragmentary view of FIGURE 1 showing a spring type adjustment.

In the alternative embodiment shown in FIGURE 2, a screw 14 extends through a tapped hole 15 in the casing 12 adjacent pole face 11 and carries on its end a spring 16 which is received in a recess 17 formed in the rocker unit frame.

Figure 3:
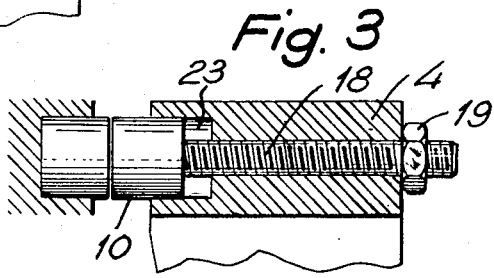
FIGURES 3 and 4 show in corresponding fashion to FIGURE 2 a worm and nut adjustment for one of the two release elements.

In the alternative constructional form illustrated in FIGURE 3, pole face 10 is mounted on the end of a threaded rod 18 which extends through the frame of rocker unit 4 and receives on its end remote from said pole face a nut 19 which bears against the frame surface. In the embodiment shown in FIGURE 4, the pole face 11 is mounted on the end of threaded rod 18a extending through a part 20 inserted into casing 12 and secured thereon by a nut 19a.

Figure 7:
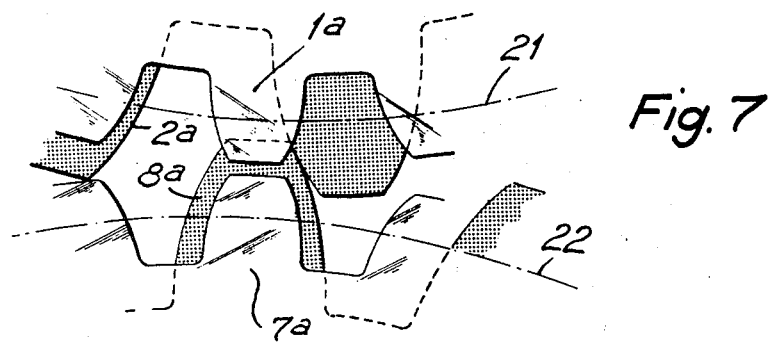
FIGURE 7 shows the manner of meshing of the pinions in FIGURE 6, in the released position.

Reference to FIGURES 6 and 7 show that pinions 1 and 7 have identical cooperating teeth 1a and 7a and that pinions 2 and 8 have likewise cooperating identical teeth 2a and 8a, except that teeth 1a and 7a are cut with a smaller module than teeth 2a and 8a, on equal pitch circles 21 and 22. Facing the top of the rocker unit head, on the side remote from the pole faces 10 and 11, is a stop 25.

The principle of operation of the device hereinbefore described is as follows:

Should a resistance of magnitude exceeding a predetermined limit be exerted through the trains of feed-output gears, the geartooth reaction exerted between pinions 1 and 7 on the one hand and pinions 2 and 8 on the other causes pole face 10 to recede and to thereby escape from the magnetic attraction of pole face 11.

The different forms of embodiment and of adjustment hereinbefore described enable the reaction thrust force to be adjusted, in conjunction with the magnetic attraction between pole faces 10 and 11, thereby varying the force required to trip the device.

The spring 16 shown in FIGURE 2 enables an opposing force to be produced (that can be adjusted by merely rotating screw 14) to oppose the magnetic force of attraction between pole faces 10 and 11, which is constant for a given air gap. It is thus possible to modify the resultant of these forces and hence the tripping threshold.

Figure 4:
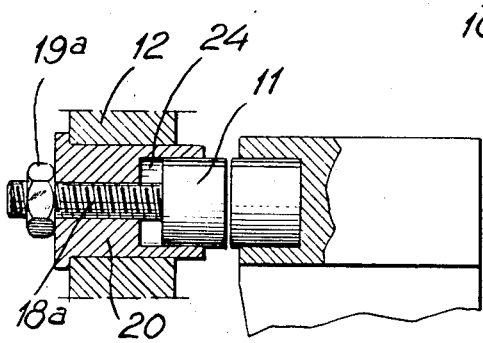

The air gap can also be adjusted by displacing pole face 10 or pole face 11 in their respective housings 23 and 24, by tightening nut 19 or 19a, as clearly shown in FIGURES 3 and 4.

In the constructional form of FIGURE 1, the eccentricity of pin 5 similarly enables the air gap between the pole faces to be adjusted.

Considering lastly the special cut of the pinions, FIGURE 7 shows that when the rocker unit recoils upon tripping it bears against stop 25 which is so positioned that when the recoil occurs the pinions 1 and 7 cut to the smaller module go out of mesh while the pinions 2 and 8 cut to the larger module remain in mesh, thereby ensuring constant driving of auxiliary pinions 7 and 8.

It goes without saying that many detail changes may be made in the specific constructional forms hereinbefore described without departing from the spirit and scope of the invention. By way of example, the tripping force could be modified by altering the section of the pole faces; furthermore, the pinions could have a helicoid cut with advantage and be coupled in pairs to form herringbone gears, which assist radial disengagement reactions without exerting axial thrust.

Figure 9:
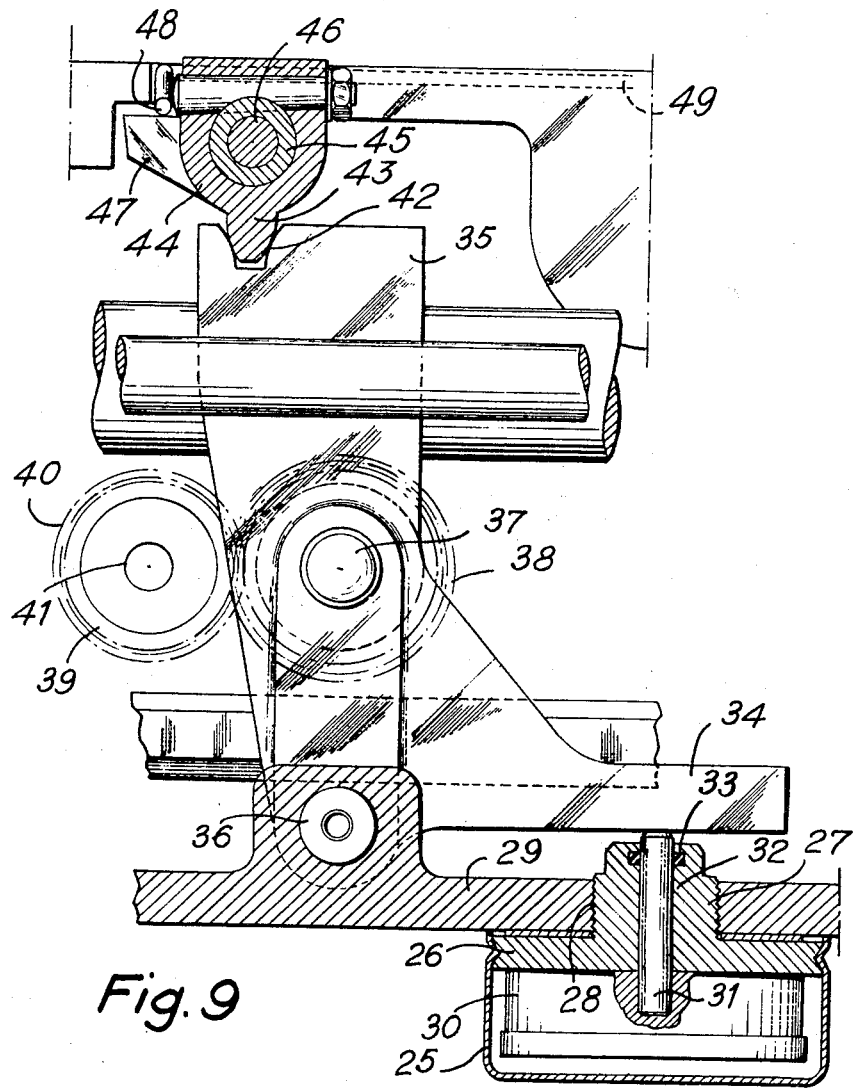
FIGURE 9 is a fragmental section on an enlarged scale, taken through the line IX—IX of FIGURE 8.
Figure 8:
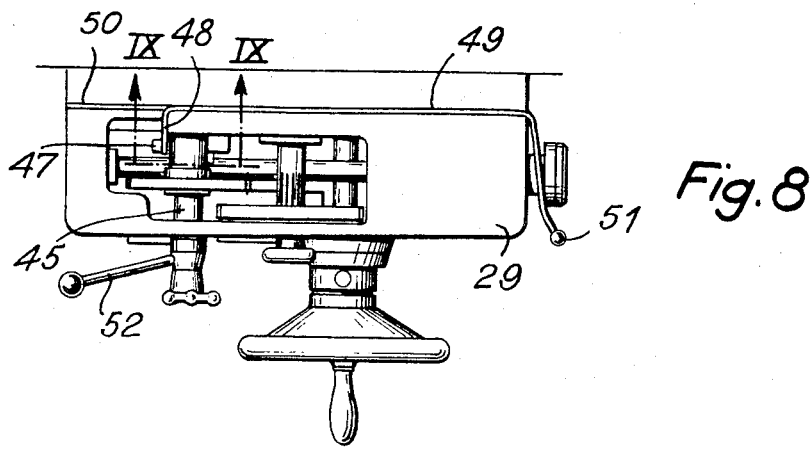
FIGURE 8 is a top view, with a panel removed, of a release mechanism case-unit used in a machine tool feed system.

Reference is now had to FIGURE 9, in which the magnetic retaining element is contained in a bowl-shaped case 25 having its edge set into a base 26 which is formed with an externally threaded central boss 27 screwed into a tapped hole 28 in one of the walls 29 of the mechanism casing.

Base 26 is made of magnetic material. Case 25 contains a pole face 30 consisting of a magnetized block which, by attraction towards base 26, is urged into contact therewith.

Magnetized block 30 is rigid with a pushrod 31 extending through a central hole 32 in boss 27, tightness during sliding motion being ensured by a gland 33 which is accommodated in a groove formed in said hole and which is applied against pushrod 31.

The end of pushrod 31 cooperates with a lever arm 34 rigid with a rocker unit cage 35 pivotably mounted on a pin 36 extending through lugs projecting inwardly on wall 29. This cage carries a shaft 37 on which two pinions 38 are mounted side by side, one being cut with large-module teeth and the other with small-module teeth. These pinions mesh respectively with two further pinions 39 and 40 cut with matching teeth, large-module pinion 39 acting as the drive input pinion and small-module pinion 40 acting as the output pinion and being keyed to driven shaft 41.

The top of cage 35 is formed with a profiled notch 42 into which engages a tooth 43 formed on a block 44 pivotally mounted on a shaft 46 through the medium of an actuating sleeve 45 therebetween.

Rigid with block 44 is a lobe 47 against which bears the cranked end 48 of a torsion bar 49 disposed longitudinally along the mechanism case of which wall 29 is part. Torsion bar 49 is doubly cranked into a U-shape, its transverse branch being retained in a longitudinal groove 50 formed on the top surface of the case. One of the torsion bar branches terminates in crank end 48 and the other, which terminates in an operating ball 51, cooperates with the teeth of an adjustment rack (not shown) centered approximately on groove 50.

The arrangement described hereinabove functions in similar fashion to the device described hereinbefore with any given adjustment provided by the force of attraction of magnet 30 on base 26, it is possible to introduce a modification thereof by suitably setting the torsion bar branch terminating in ball 51, and this adjustment creates a subtractive effect on the frame of rocker unit 25, through the agency of block 44, tooth 43 and notch 42, in respect of the magnetic holding force.

The magnetic system, which is contained in a sealed enclosure, is protected from any extraneous matter which, if it found its way into the air gap, could adversely affect the required force of attraction.

In addition, being accessible from the outside, this magnetic system can readily be unscrewed and removed, for quick substitution if need be of another, differently calibrated unit.

Once the cause of an overload trip has been corrected, rocker unit 35 can be reset, for example, by means of a lever 52 fixed to operating sleeve 45, whereby to bring the frame of rocker unit 35 into its erect position manually, through the medium of tooth 43 and notch 42, thereby loading torsion bar 49 and placing magnetized block 30 back into contact with base 26, with concurrent remeshing of the drive pinions.

Obviously, the coupling between the rocker unit frame and the torsion bar could consist of a clevis cooperating with a peg, instead of the tooth and notch arrangement shown in the drawing. Similarly, the restoring movement could be provided by an adjustably spring-loaded plunger bearing directly on the rocker unit frame, instead of the torsion bar arrangement described with reference to the drawing.

What I claim is:

1. In an automatic release device for a machine-tool interposed between a drive input member and a drive output member, the combination comprising a driving input member, a driving output member, a displaceable joining means mechanically connecting said drive input and output member, said joining means being displaceable between an engagement position and a release position, and magnetically operated maintaining means urging said displaceable joining means to its engagement position.

2. A device according to claim 1, comprising a drive pinion loosely mounted on a shaft, an output pinion angularly rigid with said shaft and a rocker member on which is mounted a pair of rigidly united pinions, one of which is adapted to mesh with said drive pinion and the other with said output pinion, said maintaining means comprising two mutually attracted magnetic pole faces of which one is rigid with said rocker member and the other with a fixed part of the device.

3. A device according to claim 2, wherein said pole faces are so disposed that the attraction which unites them holds the rocker member pinions in mesh with said drive and output pinions.

4. A device according to claim 3, wherein the rocking axis of said rocker member is eccentric.

5. A device according to claim 3, comprising an adjustable spring connected between said rocker member and said fixed part of the device.

6. A device according to claim 3, wherein at least one of the two magnetic pole faces is capable of being shifted within its housing by means of a threaded rod and a nut.

7. A device according to claim 6, wherein the two pairs of meshing pinions have the same pitch circles but different modules.

8. A device according to claim 7, including a stop for limiting the recoil of the rocker member whereby to maintain the two pinions of larger module in constant mesh.

9. A device according to claim 2, wherein said magnetic pole faces are contained in a sealed case, one magnetic pole face including a pushrod extending through a leaktight slideway therefor and adapted to cooperate with said rocker member, said case being secured in quickly detachable fashion in the casing of the mechanism comprising said rocker member, said case projecting externally from said casing.

10. A device according to claim 9, which includes, for its operation, a set of different cases of the same kind, each bearing an indication of the force of attraction it is capable of exerting, said cases being substitutable for one another in said quickly detachable securing means.

11. A device according to claim 10, wherein said quickly detachable securing means include a threaded boss on the bottom of said case, said boss having said pushrod sealingly extending therethrough and being screwed and secured into a tapped hole in the casing of the drive disengagement mechanism.

12. A device according to claim 9, wherein said rocker member has cooperating therewith a complementary adjustment element which includes a torsion bar of adjustable tension cooperating with a block formed with a tooth engaging into a notch formed at the top of said rocker member, whereby to cause said torsion bar to partly oppose the urge of the magnetic attraction device and thereby provide an adjustable resultant force for maintaining the rocker member pinions in mesh with said input and output pinions, said adjustable resultant force opposing the radial geartooth reaction, which becomes predominant in the event of overload moments.

References Cited
UNITED STATES PATENTS

| | | | |
|---|---|---|---|
| 2,906,184 | 9/1959 | Hennig et al. | 74—405 X |
| 2,907,221 | 10/1959 | Haupt | 74—352 |
| 3,183,726 | 5/1965 | Badger | 74—406 X |

FRED C. MATTERN, JR., *Primary Examiner.*

LEONARD H. GERIN, *Assistant Examiner.*